US011473431B2

(12) United States Patent
Greenberg et al.

(10) Patent No.: US 11,473,431 B2
(45) Date of Patent: Oct. 18, 2022

(54) ENERGY DISSIPATING DAMPER

(71) Applicant: UNITED TECHNOLOGIES CORPORATION, Farmington, CT (US)

(72) Inventors: Randall Lee Greenberg, Oxford, CT (US); Gregory Harrell, South Windsor, CT (US); Leong Ma, South Glastonbury, CT (US); Peter Gentile, Jr., Manchester, CT (US); Connor J. McGuire, East Hampton, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 736 days.

(21) Appl. No.: 16/351,295

(22) Filed: Mar. 12, 2019

(65) Prior Publication Data
US 2020/0291794 A1 Sep. 17, 2020

(51) Int. Cl.
*F01D 5/26* (2006.01)
*F01D 5/22* (2006.01)
(Continued)

(52) U.S. Cl.
CPC ............... *F01D 5/26* (2013.01); *F01D 5/22* (2013.01); *F04D 29/668* (2013.01); *F16F 15/12* (2013.01)

(58) Field of Classification Search
CPC ... F01D 5/26; F01D 5/22; F01D 25/06; F01D 25/04; F01D 9/065; F04D 29/668;
(Continued)

(56) References Cited

U.S. PATENT DOCUMENTS 3,047,281 A * 7/1962 Pernetta .................. F16F 1/26
267/156
3,749,168 A 7/1973 Hall, Sr.
(Continued)

FOREIGN PATENT DOCUMENTS

DE 7016559 11/1972
DE 3934805 12/1990
(Continued)

OTHER PUBLICATIONS

Debray et al. FR 3 050 229—English Machine Translation—ProQuestDocuments—Oct. 18, 2021 (Year: 2017).*
(Continued)

*Primary Examiner* — J. Todd Newton
*Assistant Examiner* — Wayne A Lambert
(74) *Attorney, Agent, or Firm* — Snell & Wilmer L.L.P.

(57) ABSTRACT

An energy dissipating damper includes a first end portion configured to be coupled to a first structure, a second end portion, opposite the first end portion, configured to contact a second structure, and a body portion extending from the first end portion to the second end portion. The body portion includes a plurality leaves. The plurality of leaves may be fixed together at the first end portion and may be separable from each other at the second end portion. In response to the energy dissipating damper being in a loaded state, the plurality of leaves may be in direct contact with each at the second end portion. The energy dissipating damper may further include a contact element coupled to the second end portion, and the contact element may comprise an abradable material.

20 Claims, 7 Drawing Sheets

(51) Int. Cl.
*F04D 29/66* (2006.01)
*F16F 15/12* (2006.01)

(58) Field of Classification Search
CPC ....... F05D 2260/96; F16F 15/12; F16F 15/06; F16F 15/073; F16F 1/18; F16F 1/24; F16F 1/26; F16F 3/023
USPC ................................. 248/636, 618, 630, 629
See application file for complete search history.

(56) References Cited

U.S. PATENT DOCUMENTS

| | | | | | |
|---|---|---|---|---|---|
| 3,785,407 | A | * | 1/1974 | Waite | F16L 59/13 138/108 |
| 4,098,476 | A | * | 7/1978 | Jutte | F16B 4/004 138/108 |
| 5,056,738 | A | * | 10/1991 | Mercer | F04D 29/668 244/54 |
| 5,262,593 | A | * | 11/1993 | Madry | H01B 11/1856 174/102 P |
| 5,284,011 | A | | 2/1994 | Von Benken | |
| 5,435,351 | A | * | 7/1995 | Head | E21B 17/206 138/113 |
| 5,497,809 | A | * | 3/1996 | Wolf | B21D 9/04 138/148 |
| 6,038,862 | A | * | 3/2000 | Melman | F23D 11/36 431/114 |
| 6,060,663 | A | * | 5/2000 | Hier | H01B 7/184 174/110 F |
| 8,137,071 | B2 | * | 3/2012 | Caucheteux | F01D 5/22 416/193 A |
| 8,258,399 | B2 | * | 9/2012 | Bonn | H01B 11/1856 174/28 |
| 9,140,213 | B2 | | 9/2015 | Sadil et al. | |
| 9,790,809 | B2 | * | 10/2017 | Dube | F01D 25/04 |
| 9,863,278 | B2 | * | 1/2018 | Sultana | F01M 13/00 |
| 11,136,894 | B2 | * | 10/2021 | Sultana | F01D 9/065 |
| 2012/0180500 | A1 | * | 7/2012 | DiCintio | F01D 25/04 60/796 |
| 2012/0186269 | A1 | * | 7/2012 | Cihlar | F23R 3/60 60/796 |
| 2019/0186270 | A1 | * | 6/2019 | Joly | F01D 5/10 |

FOREIGN PATENT DOCUMENTS

| | | | | |
|---|---|---|---|---|
| DE | 4010164 | | 12/1990 | |
| FR | 3050229 | A1 * | 10/2017 | ............. F01D 9/065 |
| FR | 3051854 | A1 * | 12/2017 | ............. F01D 9/065 |
| GB | 2442107 | A * | 3/2008 | ........... H02G 3/0412 |
| WO | WO-2013162982 | A1 * | 10/2013 | ............. F01D 25/26 |
| WO | 2018172715 | | 9/2018 | |

OTHER PUBLICATIONS

Oudyi et al. FR 3 051 854—English Machine Translation—ProQuestDocuments—Oct. 18, 2021 (Year: 2017).*
European Patent Office, European Search Report dated Jun. 30, 2020 in Application No. 20160993.0.

* cited by examiner

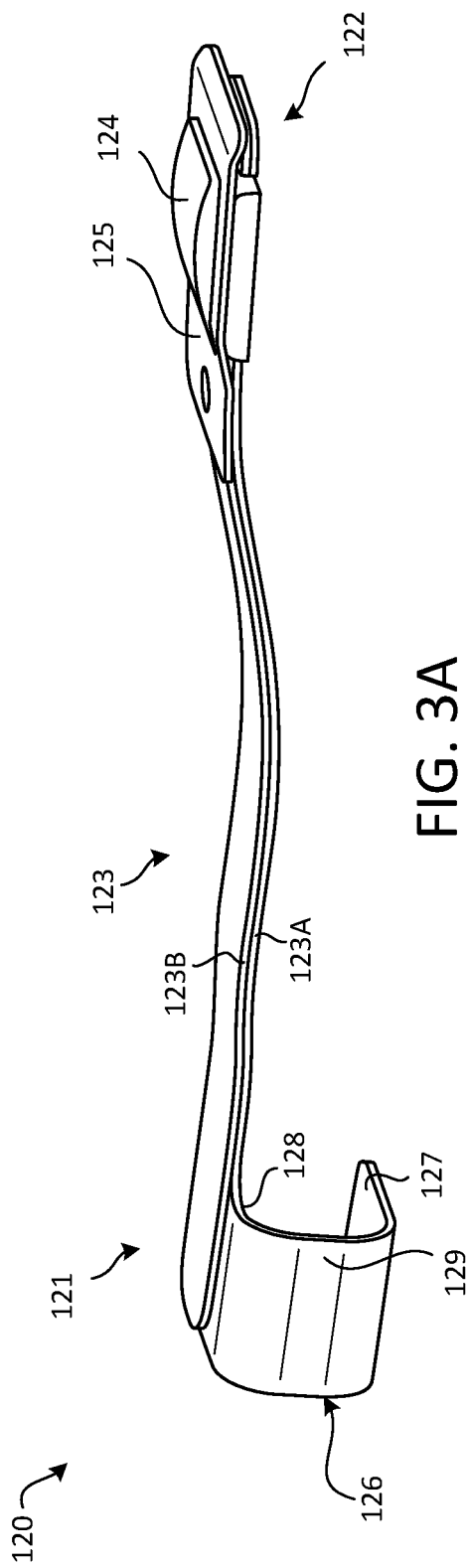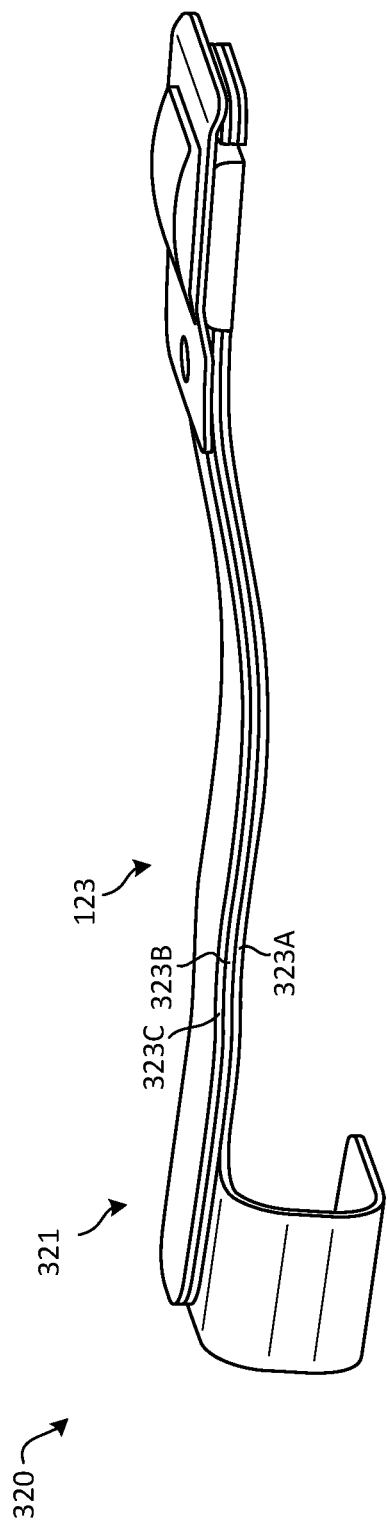
FIG. 3A
FIG. 3B

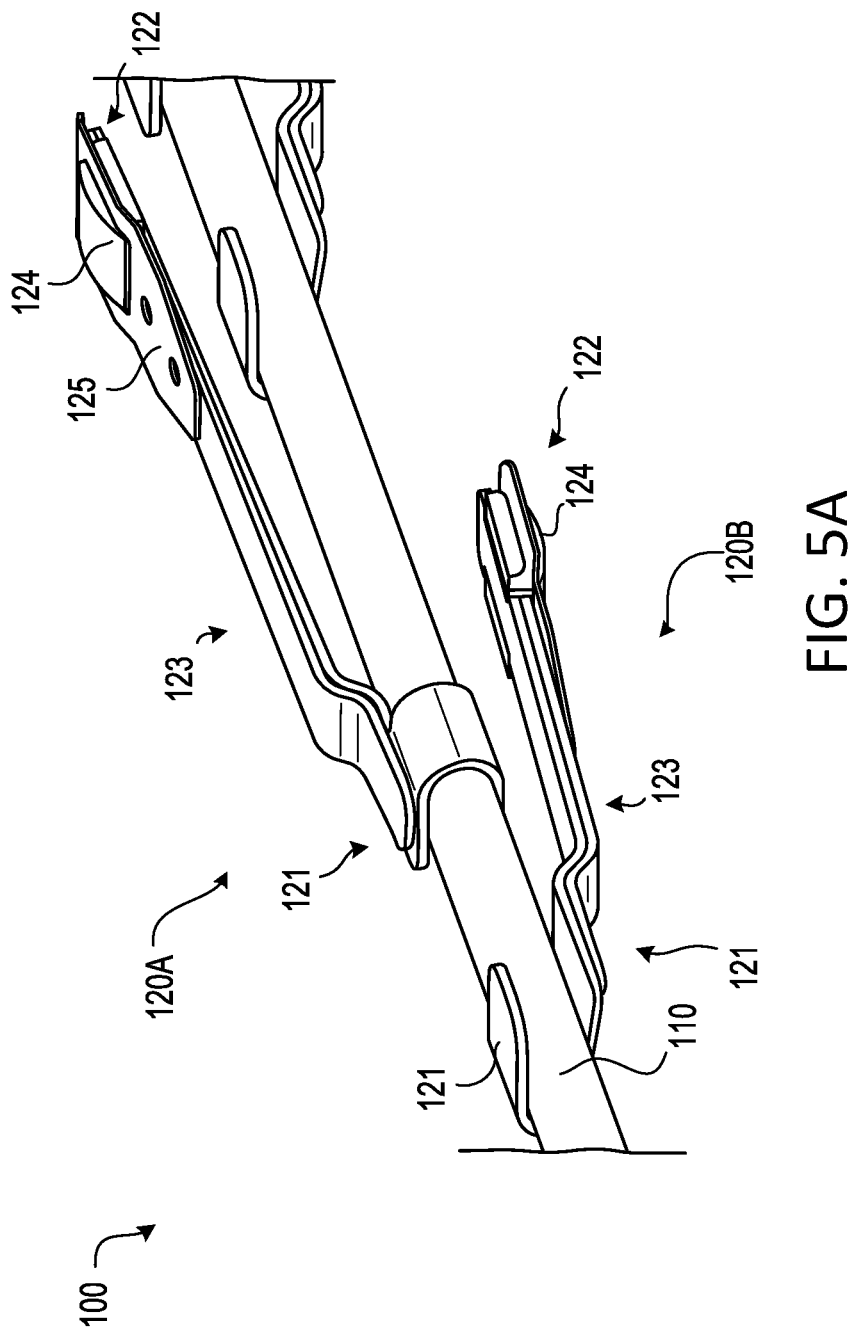

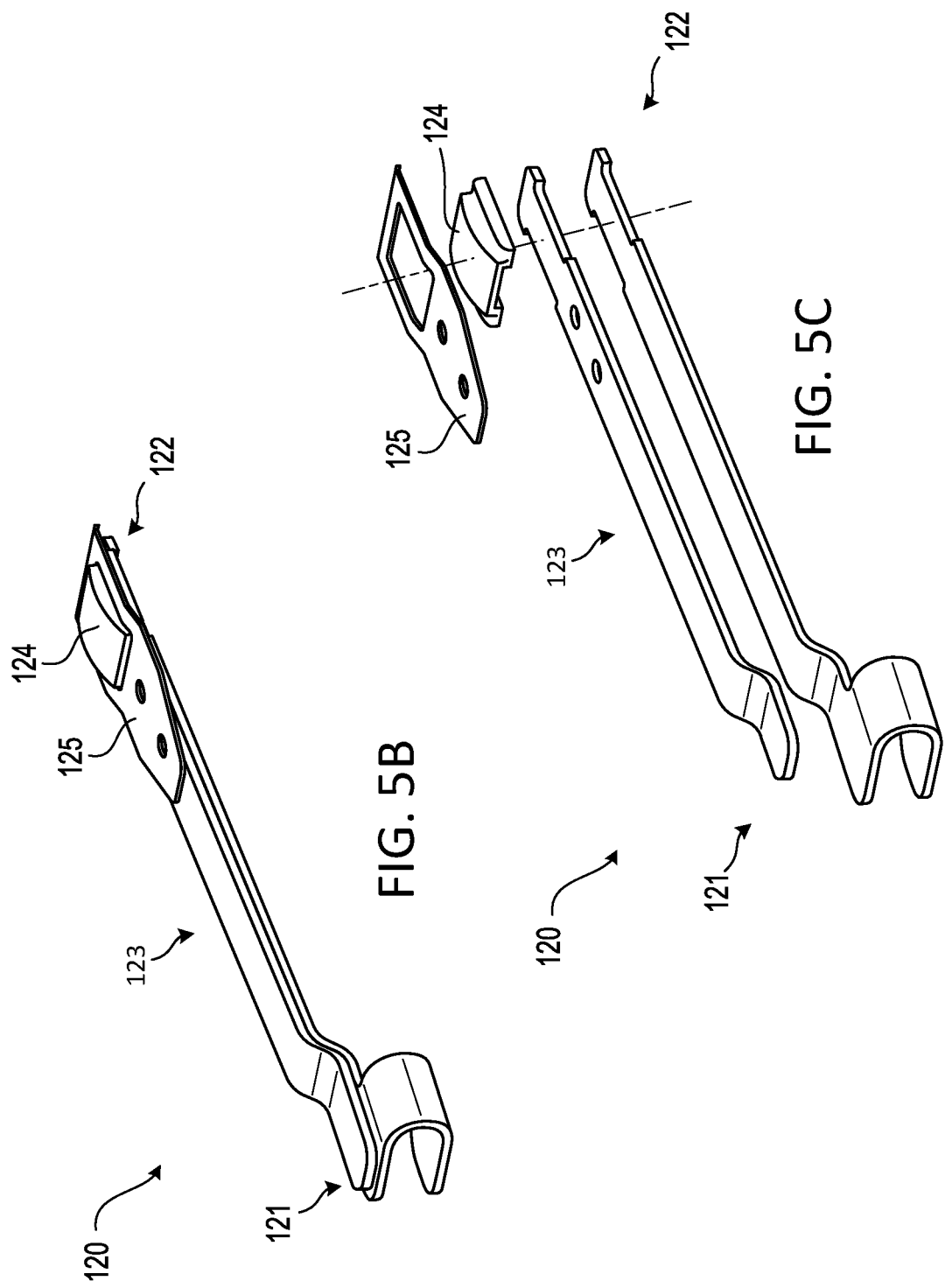

ENERGY DISSIPATING DAMPER

FIELD

The present disclosure relates to energy dissipating dampers, and more specifically to energy dissipating dampers for conduits that extend through and within vanes.

BACKGROUND

In various applications, cables or pipes are routed from one location to another. For example, in a gas turbine engine, cables and/or pipes/tubes carrying fluid may extend across a fan bypass region between a split fan duct and an internal core cowl or heat shield. Such regions may be subject to high velocity air, and exposing cables, pipes, or mounting harnesses/hardware to these high velocity air regions may adversely affect the durability and/or operability of said cables, pipes, or mounting harnesses/hardware. While extending conduits through structural vanes may protect the conduit from high velocity airflow and environmental conditions, conduits in vanes may be susceptible to natural vibration modes and resonance under operating conditions of the gas turbine engine, which can result in higher mechanical stresses, diminished part life, and/or premature failure.

SUMMARY

In various embodiments, the present disclosure provides an energy dissipating damper. The energy dissipating damper may include a first end portion configured to be coupled to a first structure, a second end portion, opposite the first end portion, configured to contact a second structure, and a body portion extending from the first end portion to the second end portion, with the body portion comprising a plurality leaves.

In various embodiments, the plurality of leaves are fixed together at the first end portion and are separable from each other at the second end portion. In various embodiments, in response to the energy dissipating damper being in a loaded state, the plurality of leaves are in direct contact with each at the second end portion. In various embodiments, the energy dissipating damper further includes a contact element coupled to the second end portion. The contact element may comprise an abradable material. Further, the energy dissipating damper may include a retention panel configured to detachably retain the contact element, and the retention panel may define an opening through which the contact element protrudes. The retention panel may only be coupled to a single leaf of the plurality of leaves. In various embodiments, the plurality of leaves comprises resiliently flexible material.

Also disclosed herein, according to various embodiments, is an assembly (e.g., a damping assembly) that includes a conduit and an energy dissipating damper. The conduit may have a first end, a second end, and a longitudinal axis. The conduit may define an inner channel and may be configured to extend through an internal vane cavity of a vane. The energy dissipating damper comprises a first end portion, a second end portion opposite the first end portion, and a body portion extending from the first end portion to the second end portion, according to various embodiments. The body portion of the energy dissipating damper may include comprises a plurality of leaves, the first end portion of the energy dissipating damper may be coupled to the conduit, the body of the energy dissipating damper may diverge outward at an angled orientation from the conduit, the second end portion of the energy dissipating damper may be configured to contact an inner surface of the vane, and the plurality of leaves of the energy dissipating damper may include resiliently flexible material.

In various embodiments, the plurality of leaves are fixed together at the first end portion and are separable from each other at the second end portion. In response to the energy dissipating damper being in a loaded state within the internal vane cavity of the vane, the plurality of leaves are in direct contact with each at the second end portion, according to various embodiments. The assembly may further include a contact element coupled to the second end portion of the energy dissipating damper, wherein the contact element is disposed on a surface of the second end portion of the energy dissipating damper facing away from the conduit. The first end portion of the energy dissipating damper may be brazed to the conduit.

In various embodiments, the first end portion of the energy dissipating damper comprises a c-shaped feature defining a channel through which the conduit extends. The c-shaped feature may include a first leg, a second leg, and a bridge segment extending between the first leg and the second leg. One of the first leg and the second leg may be mounted to the conduit and a gap may be defined between the conduit and the other of the first leg and the second leg. In various embodiments, the energy dissipating damper is a first energy dissipating damper and the assembly further comprises a second energy dissipating damper.

Also disclosed herein, according to various embodiments, is a gas turbine engine. The gas turbine engine may include a vane extending between a radially inward structure and a radially outward structure, with the vane defining an internal vane cavity. The gas turbine engine may further include a conduit extending through the internal vane cavity and defining an inner channel configured to convey at least one of fluid and wiring between the radially inward structure and the radially outward structure. Still further, the gas turbine engine may include an energy dissipating damper comprising a first end portion, a second end portion opposite the first end portion, and a body portion extending from the first end portion to the second end portion. In various embodiments, the body portion of the energy dissipating damper comprises a plurality of leaves, the first end portion of the energy dissipating damper is coupled to the conduit, the body of the energy dissipating damper diverges outward at an angled orientation from the conduit, the second end portion of the energy dissipating damper contacts an inner surface of the vane, and the plurality of leaves of the energy dissipating damper comprises resiliently flexible material.

In various embodiments, the vane comprises a leading edge, a trailing edge, and two opposing sides extending between the leading edge and the trailing edge, wherein the inner surface is of one of the two opposing sides. In various embodiments, the energy dissipating damper is a first energy dissipating damper and the gas turbine engine further comprises a second energy dissipating damper, wherein the second energy dissipating damper is coupled to the conduit opposite the first energy dissipating damper such that the second energy dissipating damper contacts the inner surface of the other of the two opposing sides.

Also disclosed herein, according to various embodiments, is a method of assembling a gas turbine engine. The method may include depressing a second end portion of an energy dissipating damper towards a conduit, wherein a first end portion of the energy dissipating damper is coupled to the conduit and the second end portion diverges outward at an angled orientation from the conduit in an undepressed state. The method may also include inserting the conduit through an aperture defined in a radially outward structure of the gas turbine engine, wherein the aperture opens to an internal vane cavity of a vane that extends between the radially outward structure and a radially inward structure.

In various embodiments, a cross-sectional diameter of the aperture is greater than a first cumulative cross-sectional diameter of the conduit and the first end portion of the energy dissipating damper and less than a second cumulative cross-sectional diameter of the conduit and the second end portion of the energy dissipating damper in an undepressed state.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

FIG. 3A is a perspective view of an energy dissipating damper having a plurality of leaves (e.g., two), in accordance with various embodiments;

FIG. 3B is a perspective view of an energy dissipating damper having a plurality of leaves (e.g., three), in accordance with various embodiments;

FIG. 5A is a perspective view of an energy dissipating damper mounted to a conduit, in accordance with various embodiments;

FIG. 5B is a perspective view of an energy dissipating damper, in accordance with various embodiments;

FIG. 5C is a perspective exploded view of an energy dissipating damper, in accordance with various embodiments.

Figure 1:
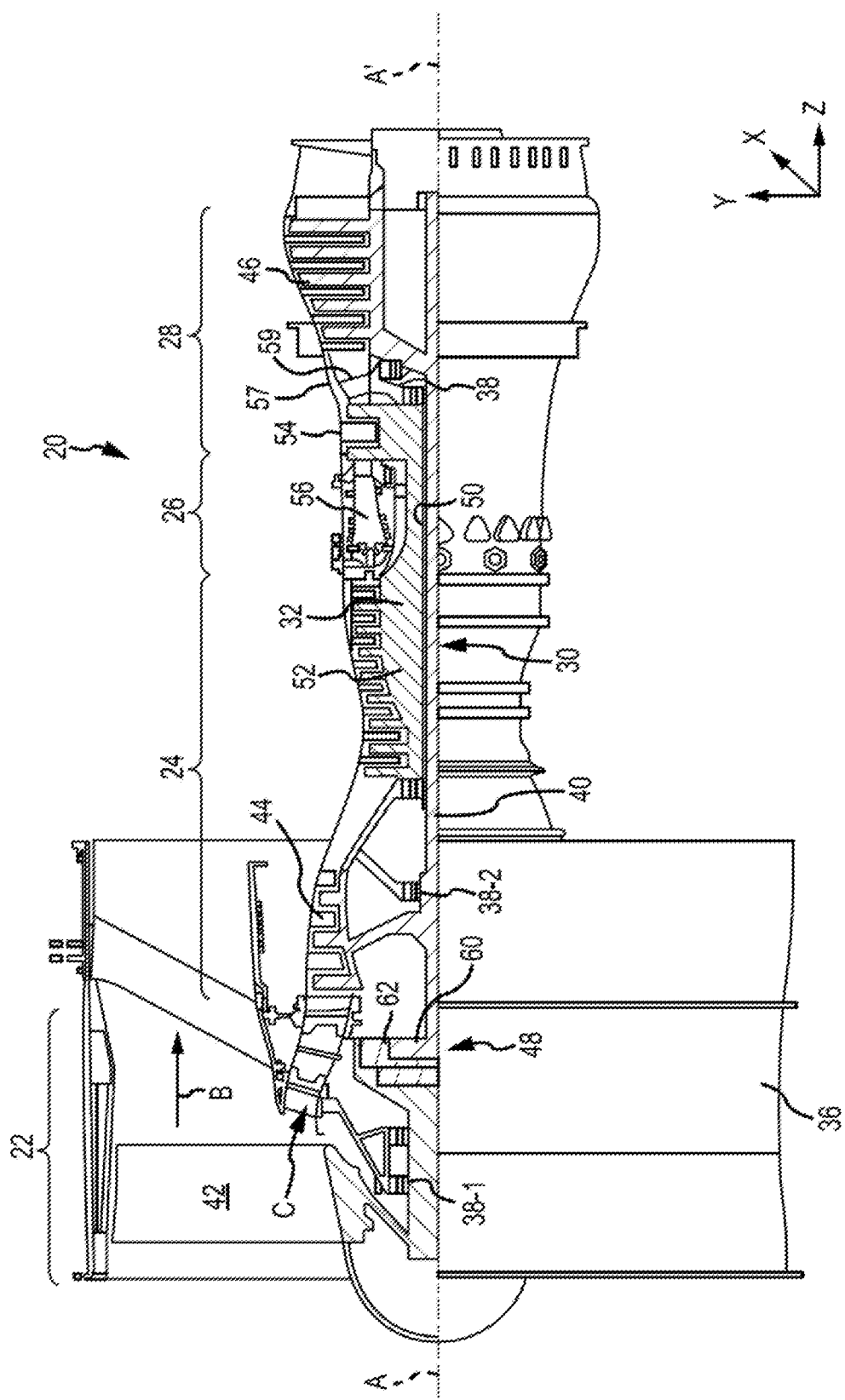
FIG. 1 is a cross-sectional view of an exemplary gas turbine engine, in accordance with various embodiments.

The subject matter of the present disclosure is particularly pointed out and distinctly claimed in the concluding end portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Disclosed herein, according to various embodiments, is an energy dissipating damper. The energy dissipating damper may, for example be used in conjunction with a conduit, to contact an inner surface of a housing/vane through which the conduit extends. The one or more energy dissipating dampers may, in various embodiments, inhibit excessive and/or resonant vibrational frequencies, thereby reducing mechanical stresses and improving the operational life of the conduit and the encompassing vane. While numerous details are included herein pertaining to energy dissipating dampers used to dissipate vibration of conduits extending through vanes of a gas turbine engine, the energy dissipating dampers may be used in other applications.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive fluid (e.g., air) along a bypass flow-path B while compressor section 24 can drive fluid along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction (axial direction) on the provided xyz axis. The y direction on the provided xyz axis refers to a radial direction, and the x direction on the provided xyz axis refers to a circumferential direction. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54.

A combustor 56 may be located between high pressure compressor 52 and high pressure turbine 54. The combustor section 26 may have an annular wall assembly having inner and outer shells that support respective inner and outer heat shielding liners. The heat shield liners may include a plurality of combustor panels that collectively define the annular combustion chamber of the combustor 56. An annular cooling cavity is defined between the respective shells and combustor panels for supplying cooling air. Impingement holes are located in the shell to supply the cooling air from an outer air plenum and into the annular cooling cavity.

A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

In various embodiments, and with reference to FIG. 3A, an energy dissipating damper 120 is provided. The energy dissipating damper 120, according to various embodiments, comprises a first end portion 121, a second end portion 122 (longitudinally opposite the first end portion 121), and a body portion 123. The body portion 123 generally extends from the first end portion 121 to the second end portion 122, and the body portion comprises a plurality of leaves 123A, 123B. That is, the body portion 123 may include a first leaf 123A and a second leaf 123B. The energy dissipating damper 120 is generally configured to damp vibrations and other frequency mode responses. More specifically, the first end portion 121 of the energy dissipating damper 120 is configured to be coupled to a first structure and the second end portion 122 of the energy dissipating damper 120 is configured to contact/engage a second structure such that vibrations and other frequency mode responses that would otherwise detrimentally affect the first structure are inhibited or at least mitigated via the energy dissipating damper, according to various embodiments.

The second end portion 122 of the energy dissipating damper 120 may include a contact element 124 for engaging the second structure. The contact element 124 may be retained in place by a retention panel 125. In various embodiments, the first structure may be a conduit or other tube-like element, and the first end portion 121 of the energy dissipating damper 120 may include a c-shaped feature that defines a channel through which the conduit or tube-like element extends. The c-shaped feature may include a first leg 127, a second leg 128, and a bridge segment 129 extending between the first leg 127 and the second leg 128. Additional details pertaining to the contact element 124, the retention panel 125, and the c-shaped feature are included below.

In various embodiments, the energy dissipating damper 120 is made from a resiliently flexible material. In various embodiments, the plurality of leaves 123A, 123B of the body portion 123 of the energy dissipating damper 120 further facilitate energy dissipation and vibration inhibition due to relative movement/motion between the plurality of leaves 123A, 123B. For example, the plurality of leaves 123A, 123B may be fixed together at the first end portion 121 of the energy dissipating damper 120 and the plurality of leaves 123A, 123B may be separable from each other at the second end portion 122 of the energy dissipating damper 120. That is, the plurality of leaves 123A, 123B may be permanently connected together (e.g., through welding, adhesives, brazing) and thus may be referred to as the fixed end (due to the fixed nature of the corresponding ends of the leaves 123A, 123B) while the plurality of leaves 123A, 123B may not be fixed together at the second end portion 122 and thus the second end portion 122 may be referred to as the free end (due to the non-fixed, separable nature of the corresponding ends of the leaves 123A, 123B). Accordingly, the plurality of leaves 123A, 123B, which may be referred to as layers or plies, are not fixed together along their entire length. That is, more than half of the length of each leaf of the plurality of leaves 123A, 123B is not directly fixed to an adjacent leaf. In various embodiments, in response to the energy dissipating damper being in a loaded state (e.g., in an installed, compressed state, as described in greater detail below), the plurality of leaves are in direct contact with each other at the second end portion 122 of the energy dissipating damper. That is, although leaves 123A, 123B at the second end portion 122 are not fixed/mounted to each other, they may be in direct contact with each other such that friction resulting from relative movement between the leaves 123A, 123B facilitates energy dissipation and vibration damping.

In various embodiments, and with reference to FIG. 3B, the body portion 123 of the energy dissipating damper 320 includes three leaves 323A, 323B, 323C. The three layers/leaves 323A, 323B, 323C, similar to the configuration described above with reference to FIG. 3A, may only be fixed together at the first end 321 of the energy dissipating damper 320, with remaining length of the leaves 323A, 323B, 323C extending alongside each other but not being positively fixed together. The body portion of the energy dissipating assembly may have more than three layers/leaves.

Figure 2:
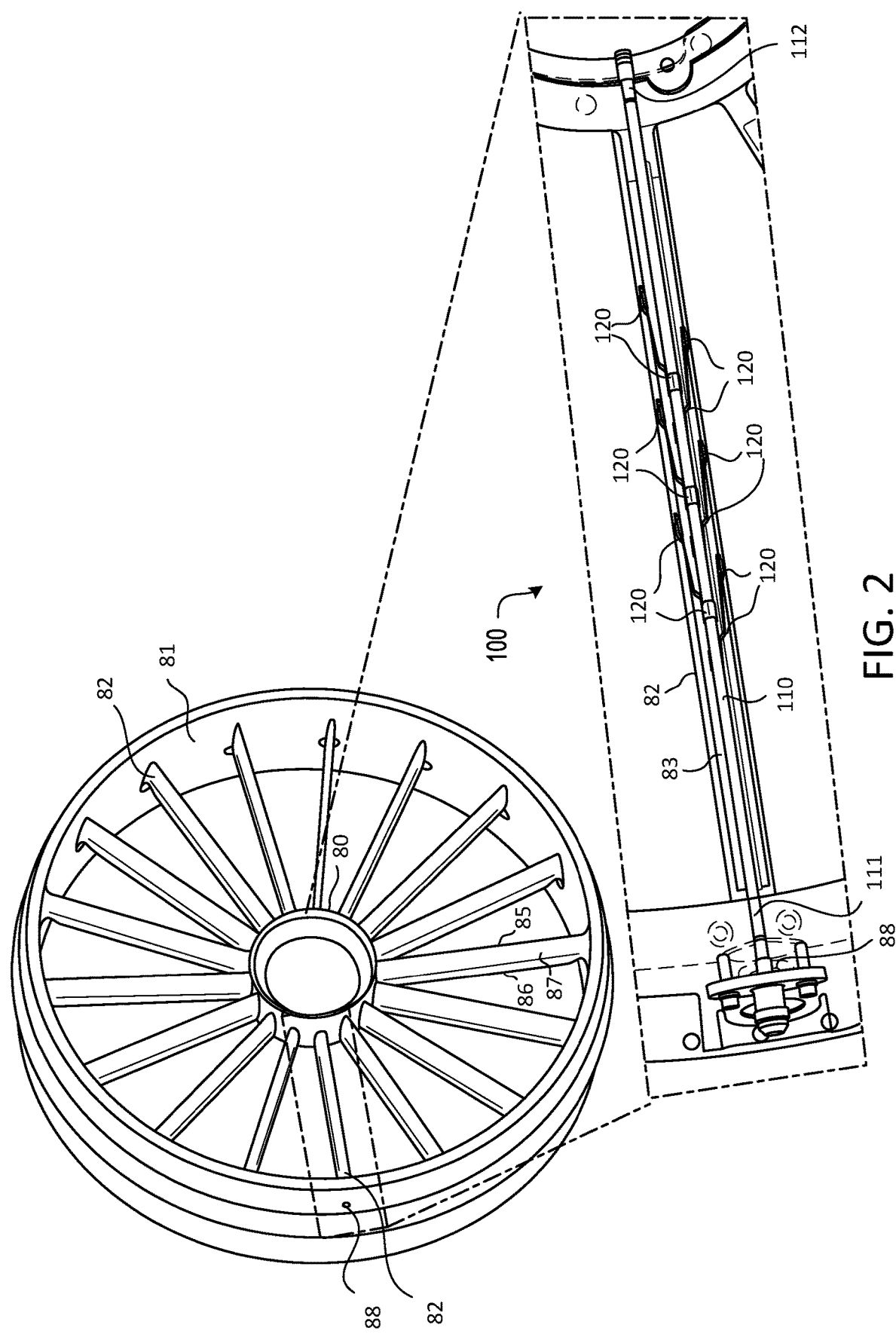
FIG. 2 is a perspective view of a damping assembly disposed within an internal vane cavity of a vane, including a magnified view of the damping assembly having a conduit and an energy dissipating damper, in accordance with various embodiments.
Figure 4:
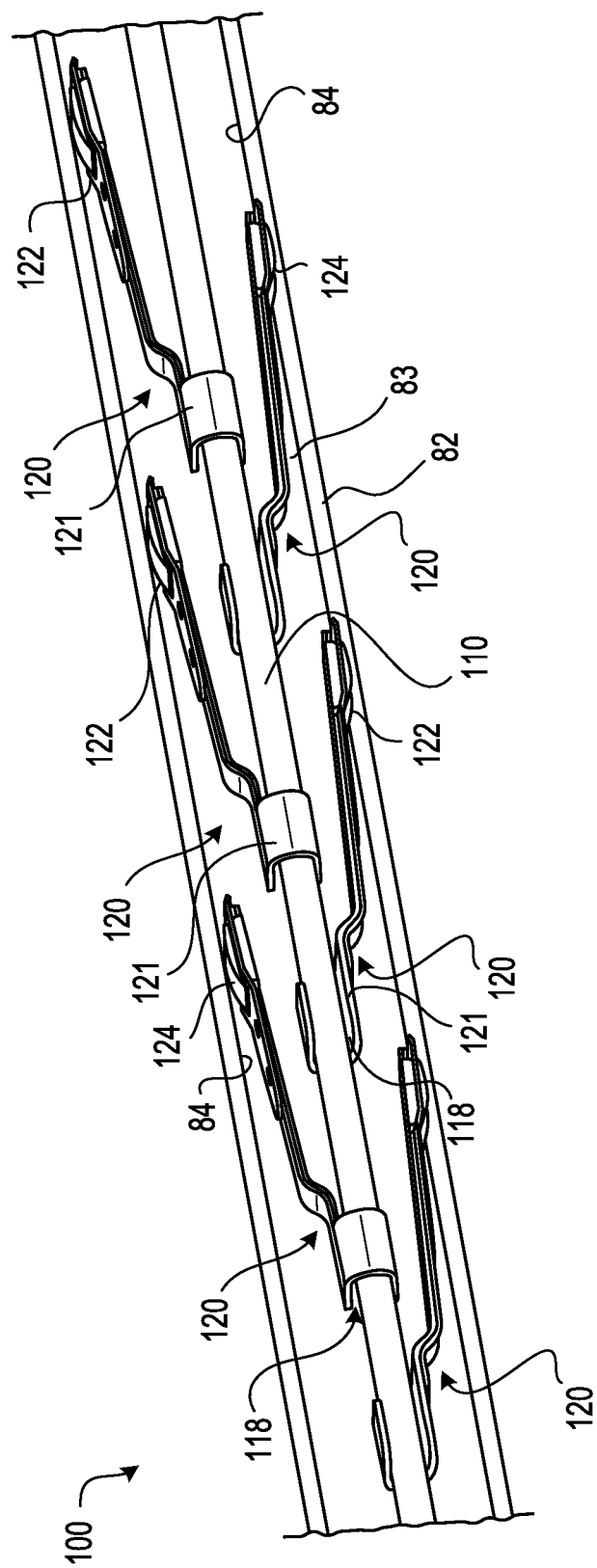
FIG. 4 is a perspective view of a damping assembly disposed within an internal vane cavity of a vane, in accordance with various embodiments.

In various embodiments, and with reference to FIGS. 2 and 4, a damping assembly 100 is provided that includes a conduit 110 and at least one energy dissipating damper 120. The conduit has a first end 111, a second end 112, and a longitudinal axis, and also defines an inner channel, according to various embodiments. The conduit 110 is generally configured to extend through a housing, such as a structural support vane 82 of gas turbine engine 20, and is configured to convey fluids and/or wiring. The energy dissipating damper 120, as described above, includes a first end portion 121 coupled to the conduit 110 and a second end portion 122 diverging radially outward at an angled orientation from the conduit 110, according to various embodiments. The energy dissipating damper 120 may have resiliently flexible properties. For example, the energy dissipating damper 120 may be made from a resiliently flexible material and/or may be made from a resilient material that is shaped and configured so as to be capable of resiliently bending or flexing in response to the second end portion 122 of the energy dissipating damper contacting an inner surface 84 of the housing (i.e., in response to the energy dissipating damper 120 being in a loaded, installed state) to damp vibrations and other frequency mode response.

In various embodiments, the energy dissipating damper 120 may be made from a high performance nickel-based super alloy (i.e., an alloy that comprises, by wt %, 58% nickel, 19% chromium, 13% cobalt, 4% molybdenum, 3% titanium and 1.4% aluminum that is available under the trade name Waspaloy™, available from Special Metals Corporation of New Hartford, N.Y.). As another example, the energy dissipating damper 120 may include a cobalt-nickel-chromium-tungsten alloy (i.e., an alloy that comprises, by wt %, 39% cobalt, 22% nickel, 22% chromium and 14% tungsten that is available under the trademark HAYNES™ 188, available from Haynes International, Inc. of Kokomo, Ind., USA). As yet another example, the energy dissipating damper may include an austenitic nickel-chromium-based alloy (i.e., an alloy that by comprises, by wt %, between 17% and 21% chromium, between 2.8% and 3.3% molybdenum, between 50% and 55% nickel, and between 4.75% and 5.5% niobium that is available under the trade name INCONEL 718, available from the Special Metals Corporation of Huntington, W.V., USA). Because the conduit 110 is supported within the housing/vane via the one or more resiliently flexible energy dissipating dampers 120, detrimental frequencies of the conduit are damped, thus reducing mechanical stresses experienced by the conduit 110 and the surrounding structure.

In various embodiments, and with continued reference to FIGS. 2 and 4, fluid or wiring may be routed through the conduit 110, and the conduit 110 may extend through a vane 82 that spans between a radially inward structure 80 and a radially outward structure 81 of the gas turbine engine 20. That is, the gas turbine engine 20 may include a radially inward structure 80, such as a hub or other centrally disposed structure, and a radially outward structure 81, such as a case structure. For example, the vane 82 may extend across a fan bypass region between a split fan duct and an internal core cowl or heat shield. The vane may define an internal vane cavity 83, through which the conduit 110 extends.

In various embodiments, and with reference to FIGS. 4, 5A, 5B, and 5C, the first end portion 121 of the energy dissipating damper 120 is welded, brazed, or otherwise connected/coupled to the conduit 110. In various embodiments, and momentarily returning to reference to FIG. 3A, the first end portion 121 may have the c-shaped feature 126 through which the conduit 110 is configured to extend. The first leg 127 of the c-shaped feature 126 may be fixed (e.g., brazed, welded) to the conduit 110, while the second leg 128 of the c-shaped feature may be positioned a distance away from the conduit 110, thus defining a gap 118 between the second leg 128 of the c-shaped feature 126 and the conduit 110. By sizing the c-shaped feature to be larger than the diameter of the conduit 110, manufacturing tolerance requirements are not as strict (as would otherwise be necessary for clamping about the conduit), and damping may further be improved as mechanical vibration transfer is through the bridge segment 129 (FIG. 3A) of the c-shaped feature.

In various embodiments, as mentioned above, the second end portion 122 of the energy dissipating damper 120 includes a contact element 124. The contact element 124 may facilitate installation of the conduit 110 through and within the internal vane cavity 83, as described in greater detail below with reference to FIG. 6, and may further facilitate the energy dissipating ability of the assembly. In various embodiments, the contact element 124 is made from a graphite material or other wear resistant material. For example, the contact element 124 may be made from an abradable material. The contact element may 124 be exclusively disposed on a surface of the tip of the second end portion 122 of the energy dissipating damper 120 that is facing away from the conduit 110.

In various embodiments, and with reference to FIGS. 5A, 5B, and 5C, the contact element 124 is detachably coupled to the second end portion 122 of the energy dissipating damper 120. In various embodiments, the contact element 124 is replaceable. For example, the energy dissipating damper 120 may include a retention panel 125 that is detachably coupled to the second end portion 122 to retain the contact element 124. In various embodiments, retention panel 125 may define an opening through which the contact element 124 protrudes. The retention panel 125 may be coupled to the topmost (e.g., radially outward) leaf of the plurality of leaves. That is, the retention panel 125 may be coupled to a single leaf of the plurality of leaves to preserve the ability of relative motion/movement to occur between the plurality of leaves. In various embodiments, the second end portion 122 of the energy dissipating damper is made from or includes a coating or other material that facilitates damping.

In various embodiments, and returning to reference FIG. 2, the energy dissipating damper 120 may be disposed medially between the first and second ends 111, 112 of the conduit 110, and thus medially between the radially inward structure 80 and the radially outward structure 81. In various embodiments, and with momentary reference to FIG. 5A, the energy dissipating damper 120A is a first energy dissipating damper and the damping assembly 100 further includes a second energy dissipating damper 120B (e.g., the damping assembly 100 may include a plurality of energy dissipating dampers). The first and second energy dissipating dampers 120A, 120B may be coupled to opposite sides of the conduit 110. Said differently, and with reference to FIG. 5A, the second energy dissipating damper 120B may be coupled to the conduit 110 opposite the first energy dissipating damper 120A. In various embodiments, the first and second energy dissipating dampers 120A, 120B may be one energy dissipating damper pair of a plurality of energy dissipating damper pairs. These energy dissipating damper pairs may be distributed along the longitudinal axis of the conduit 110 between the first end 111 and the second end 112, and thus distributed between the radially inward structure 80 and the radially outward structure 81. In various embodiments, all the energy dissipating dampers are disposed medially along the conduit.

In various embodiments, and with renewed reference to FIG. 2, the vane 82 may include a leading edge 85, a trailing edge 86, and two opposing sides 87 extending between the leading edge and the trailing edge. The inner surface 84 against which the second end portion 122 of the energy dissipating damper 120 is engaged is one of these two opposing sides, according to various embodiments. In various embodiments, a pair of opposing energy dissipating dampers (e.g., 120A, 120B) may engage the opposing sides of the vane 82, respectively. Said differently, a first energy dissipating damper 120A may contact a first inner surface and a second energy dissipating damper 120B opposite the first energy dissipating damper 120A may contact a second inner surface opposite the first inner surface.

Figure 6:
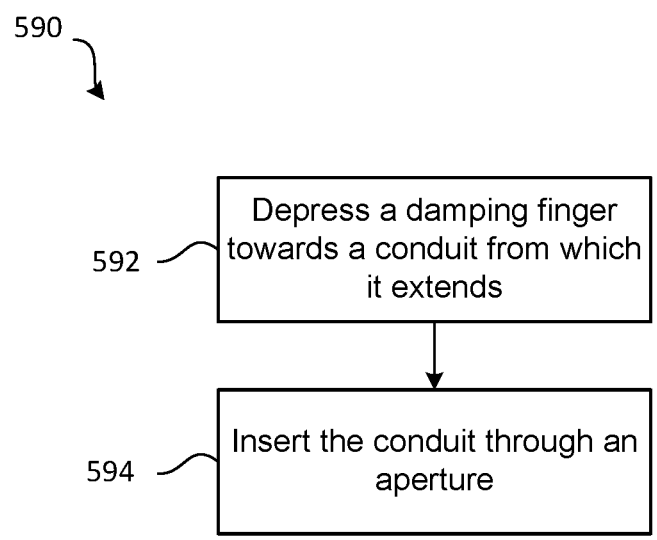
FIG. 6 is a schematic flow chart diagram of a method of assembling a gas turbine engine, in accordance with various embodiments.

In various embodiments, and with reference to FIG. 6, a method 590 of assembling a gas turbine engine 20 is provided. The method 590 may include depressing the energy dissipating damper 120 towards the conduit 110 at step 592 and inserting the conduit 110 through an aperture 88 (see FIG. 2) at step 594. In various embodiments, and with momentary reference to FIG. 2, the aperture 88 may be defined in the radially outward structure 81 and may be open to the internal vane cavity 83 defined within the vane 82. In various embodiments, a user may only have access to the radially outward structure 81 (and not the radially inward structure). In various embodiments, a cross-sectional diameter of the aperture 88 is greater than a first cumulative cross-sectional diameter of the conduit 110 and the first end portion 121 of the energy dissipating damper 120 and less than a second cumulative cross-sectional diameter of the conduit 110 and the second end portion 122 of the energy dissipating damper 120 in an undepressed state. In various embodiments, the cross-sectional diameter of the aperture 88 is less than 50% of the diameter of the internal vane cavity 83. In various embodiments, the first end portion 121 of the energy dissipating damper 120 is radially outward of the second end portion 122, thereby allowing the second end 112 of the conduit 110 and the second end portion 122 of the energy dissipating damper 120 to be inserted (step 594) through the aperture 88 before the first end 111 of the conduit 110 and before the first end portion 121 of the energy dissipating damper 120. This enables the conduit 110 to be subsequently withdrawn from the internal vane cavity 83 via the aperture 88, as the first end portion 121 of the energy dissipating damper 120 fits through the aperture 88 and the action of withdrawing the conduit 110 depresses the second end portion 122 of the energy dissipating damper 120.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An energy dissipating damper comprising:
   a first end portion configured to be coupled to a first structure, wherein the first end portion of the energy dissipating damper comprises a first leg, a second leg, and a bridge segment extending between the first leg and the second leg, the first end portion being connected to at least one of the first leg and the second leg;
   a second end portion, opposite the first end portion, configured to contact a second structure; and
   a body portion extending from the first end portion to the second end portion, the body portion comprising a plurality of leaves, wherein the plurality of leaves are configured to be in frictional contact with each other, wherein the first end portion of the energy dissipating damper comprises a c-shaped feature defining a channel through which a tube-like element is configured to extend, wherein the c-shaped feature comprises the first leg, the second leg, and the bridge segment extending between the first leg and the second leg.

2. The energy dissipating damper of claim 1, wherein the plurality of leaves are fixed together at the first end portion and are separable from each other at the second end portion.

3. The energy dissipating damper of claim 2, wherein in response to the energy dissipating damper being in a loaded state, the plurality of leaves are in direct contact with each other at the second end portion.

4. The energy dissipating damper of claim 2, further comprising a contact element coupled to the second end portion, wherein the contact element comprises an abradable material.

5. The energy dissipating damper of claim 4, further comprising a retention panel configured to detachably retain the contact element.

6. The energy dissipating damper of claim 5, wherein the retention panel defines an opening through which the contact element protrudes.

7. The energy dissipating damper of claim 5, wherein the retention panel is coupled to a single leaf of the plurality of leaves.

8. The energy dissipating damper of claim 1, wherein the plurality of leaves comprises resiliently flexible material.

9. An assembly comprising:
a conduit comprising a first end, a second end, and a longitudinal axis, wherein the conduit defines an inner channel and is configured to extend through an internal vane cavity of a vane; and
an energy dissipating damper comprising a first end portion, a second end portion opposite the first end portion, and a body portion extending from the first end portion to the second end portion;
wherein:
the body portion of the energy dissipating damper comprises a plurality of leaves, wherein the plurality of leaves are configured to be in frictional contact with each other;
the first end portion of the energy dissipating damper is coupled to the conduit;
the body portion of the energy dissipating damper diverges outward at an angled orientation from the conduit;
the second end portion of the energy dissipating damper is configured to contact an inner surface of the vane; and
the plurality of leaves of the energy dissipating damper comprises resiliently flexible material,
wherein the first end portion of the energy dissipating damper comprises a c-shaped feature defining a channel through which the conduit extends, wherein the c-shaped feature comprises a first leg, a second leg, and a bridge segment extending between the first leg and the second leg, the first end portion being connected to at least one of the first leg and the second leg, wherein at least one of the first le, and the second leg is mounted to the conduit and a gap is defined between the conduit and the other of the first leg and the second leg.

10. The assembly of claim 9, wherein the plurality of leaves are fixed together at the first end portion and are separable from each other at the second end portion.

11. The assembly of claim 10, wherein in response to the energy dissipating damper being in a loaded state within the internal vane cavity of the vane, the plurality of leaves are in direct contact with each other at the second end portion.

12. The assembly of claim 10, further comprising a contact element coupled to the second end portion of the energy dissipating damper, wherein the contact element is disposed on a surface of the second end portion of the energy dissipating damper facing away from the conduit.

13. The assembly of claim 9, wherein the first end portion of the energy dissipating damper is brazed to the conduit.

14. The assembly of claim 9, wherein the energy dissipating damper is a first energy dissipating damper and the assembly further comprises a second energy dissipating damper.

15. A gas turbine engine comprising:
a vane extending between a radially inward structure and a radially outward structure, the vane defining an internal vane cavity;
a conduit extending through the internal vane cavity and defining an inner channel configured to convey at least one of fluid and wiring between the radially inward structure and the radially outward structure; and
an energy dissipating damper comprising a first end portion, a second end portion opposite the first end portion, and a body portion extending from the first end portion to the second end portion;
wherein:
the body portion of the energy dissipating damper comprises a plurality of leaves, wherein the plurality of leaves are configured to be in frictional contact with each other;
the first end portion of the energy dissipating damper is coupled to the conduit;
the body portion of the energy dissipating damper diverges outward at an angled orientation from the conduit;
the second end portion of the energy dissipating damper contacts an inner surface of the vane; and
the plurality of leaves of the energy dissipating damper comprises resiliently flexible material,
wherein the first end portion of the energy dissipating damper comprises a c-shaped feature defining a channel through which the conduit extends, wherein the c-shaped feature comprises a first leg, a second leg, and a bridge segment extending between the first leg and the second leg, the first end portion being connected to at least one of the first leg and the second leg, wherein at least one of the first leg and the second leg is mounted to the conduit and a gap is defined between the conduit and the other of the first leg and the second leg.

16. The gas turbine engine of claim 15, wherein the vane comprises a leading edge, a trailing edge, and two opposing sides extending between the leading edge and the trailing edge, wherein the inner surface is of one of the two opposing sides.

17. The gas turbine engine of claim 16, wherein the energy dissipating damper is a first energy dissipating damper and the gas turbine engine further comprises a second energy dissipating damper, wherein the second energy dissipating damper is coupled to the conduit opposite the first energy dissipating damper such that the second energy dissipating damper contacts the inner surface of the other of the two opposing sides.

18. The gas turbine engine of claim 15, wherein the plurality of leaves are fixed together at the first end portion and are separable from each other at the second end portion.

19. The energy dissipating damper of claim 1, wherein one of the first leg and the second leg is mounted to the tube-like element and a gap is defined between the tube-like element and the other of the first leg and the second leg.

20. The assembly of claim 14, wherein the second energy dissipating damper is coupled to the conduit opposite the first energy dissipating damper.

\* \* \* \* \*

UNITED STATES PATENT AND TRADEMARK OFFICE
CERTIFICATE OF CORRECTION

PATENT NO. : 11,473,431 B2
APPLICATION NO. : 16/351295
DATED : October 18, 2022
INVENTOR(S) : Randall Lee Greenberg et al.

It is certified that error appears in the above-identified patent and that said Letters Patent is hereby corrected as shown below:

In the Claims

Column 11, Line 57 - after the word "first" please delete "le," and insert the word --leg--

Signed and Sealed this
Twenty-eighth Day of March, 2023

Katherine Kelly Vidal
*Director of the United States Patent and Trademark Office*